UNITED STATES PATENT OFFICE.

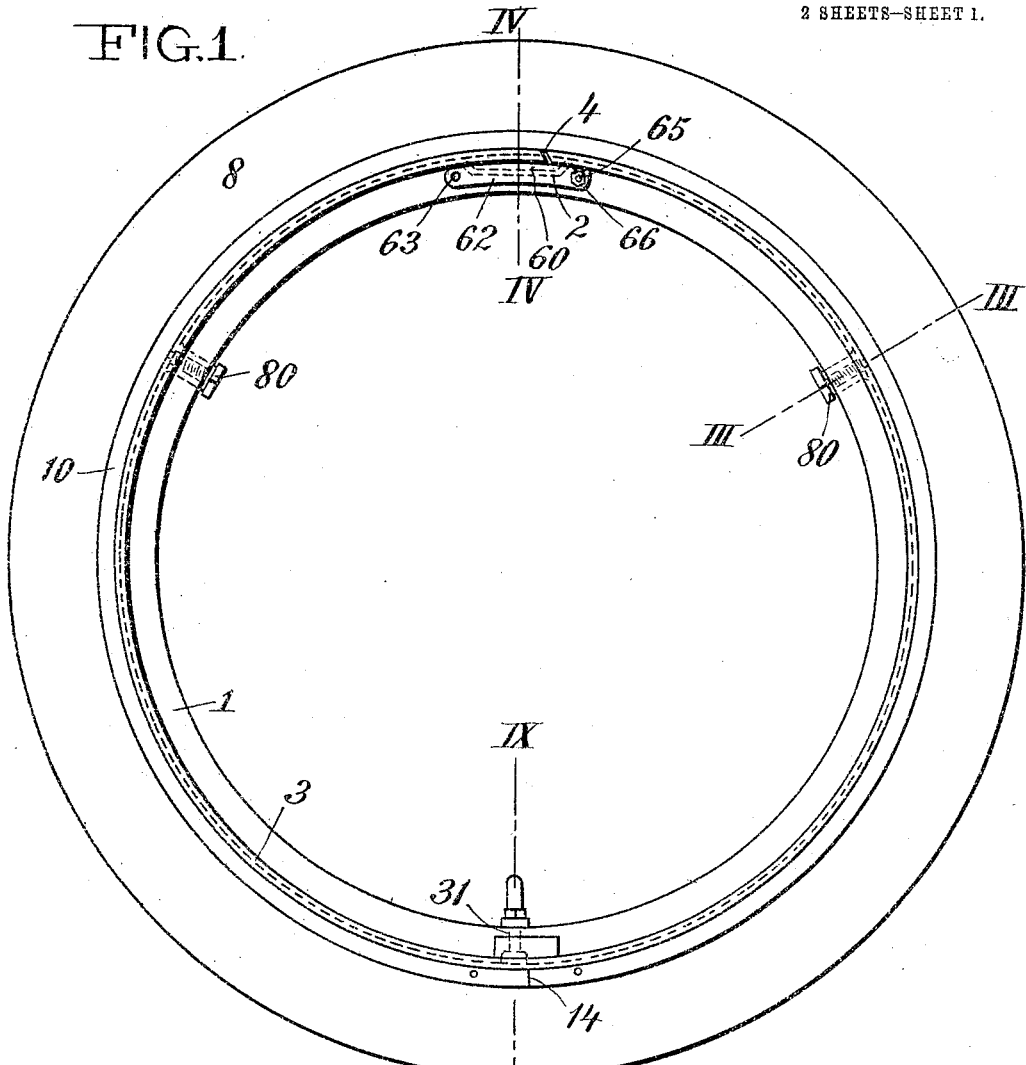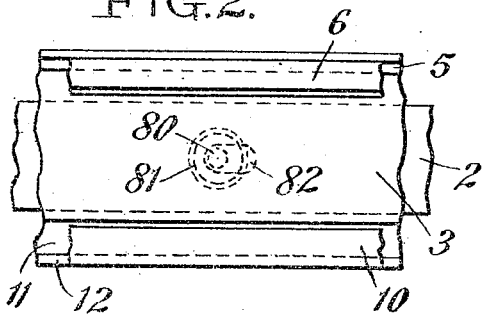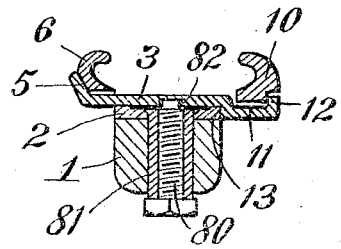

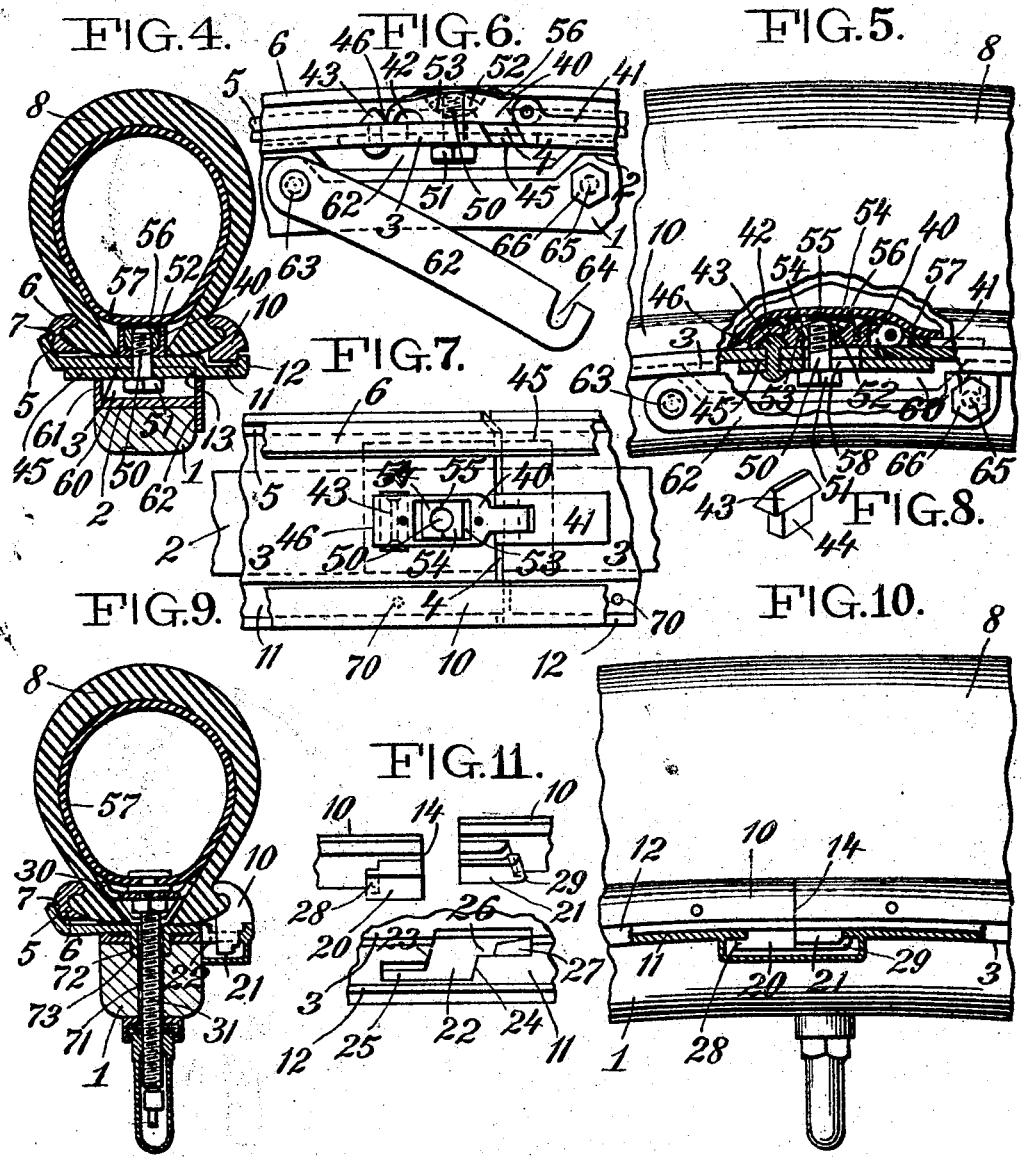

EDWIN C. SHAW, OF AKRON, OHIO, ASSIGNOR, BY MESNE ASSIGNMENTS, TO THE B. F. GOODRICH COMPANY, A CORPORATION OF NEW YORK.

VEHICLE WHEEL-RIM.

1,077,233.  Specification of Letters Patent.  Patented Oct. 28, 1913.

Application filed January 8, 1910. Serial No. 536,971.

*To all whom it may concern:*

Be it known that I, EDWIN C. SHAW, a citizen of the United States, residing at Akron, in the county of Summit, in the State of Ohio, have invented certain new and useful Improvements in Vehicle Wheel-Rims, of which the following is a specification.

My invention relates to what are known as demountable rims, in which a rim member capable of holding an inflated tire and which is so formed that it may be readily applied to and removed from a vehicle wheel, is used, my invention also contemplating the provision of means whereby the rim may be used as what is commonly called a "quick-detachable" rim, that is a rim in which one tire retaining flange may be removed to permit taking off, or application of, the tire.

In the accompanying drawings which form a part of this specification, I have illustrated a preferred embodiment of my invention showing a rim adapted for holding a clencher tire, but I have chosen this form merely as an illustration and it will be understood that the rim may be modified to hold a Dunlop or other type of tire, or may be changed in many other ways.

In these drawings Figure 1 is a side elevation of a wheel felly with a rim embodying my invention applied thereto; Fig. 2 is a plan view on an enlarged scale of a portion of the rim showing in dotted lines the set screw receiving recess and set screw; Fig. 3 is a section on line III—III of Fig. 1; Fig. 4 is a section on IV—IV of Fig. 1; Fig. 5 is a side view of a portion of the felly, rim and tire, the parts being broken away to show the latch mechanism; Fig. 6 is a view similar to Fig. 5, the tire and split flange being removed and the rim being shown expanded; Fig. 7 is a plan view of the parts shown in Fig. 5, the tire being removed; Fig. 8 is a perspective view of the locking lug before attachment to the rim; Fig. 9 is a section on line IX—IX of Fig. 1; Fig. 10 is a side view of the portions of the felly, rim and tire through which the section Fig. 9 is taken, parts being broken away to show the locking devices for the split ring; Fig. 11 is a perspective view illustrating the locking devices for the split ring; Fig. 12 is a sectional view corresponding to Fig. 9 of a wheel felly and rim embodying a modification of my invention; Fig. 13 is a fragmentary sectional view showing the construction of the split ring and ring receiving flange at a point removed from the locking mechanism shown in Fig. 12; Fig. 14 is a view similar to Fig. 12 of another modification of my invention.

Referring to the drawings in detail, the numeral 1 designates a wheel felly provided with a fixed rim 2. 3 is the demountable rim split transversely as indicated at 4. In my preferred construction, as shown in Figs. 1 to 9, inclusive, this rim is provided at one side with the inclined, outwardly projecting flange 5 against which bears an endless tire retaining flange ring or clench 6 having an inclined face 7 adapted to bear against the inner face of the inclined flange 5. This flange or clench 6 is adapted to receive and retain one bead of the tire shoe 8. For retaining the other tire bead a split retaining ring or flange 10 is provided. This ring seats in a channel 11, preferably formed by offsetting the marginal portion of the split rim 3, the offset portion being provided with an upturned flange 12 to prevent lateral movement of the ring 10, and also forming a shoulder 13 adapted to abut against one side of the felly 1 or fixed rim 2 to limit the lateral movement of the split rim. For locking the ends of the split ring 10 together and retaining the ring upon the split rim, I may use any desired locking means, but prefer to use means similar to those shown and described in my Patent No. 926,296, dated June 29, 1909. I have illustrated such a construction in Figs. 9, 10 and 11. The locking means shown in these figures comprise lugs 20 and 21 projecting from the under surface of the ring 10, one lug being located upon each side of the split 14 therein. The bottom of the channel 11 is provided with a slot 22 for the reception of these lugs. This slot comprises a main portion having inclined ends 23 and 24 and circumferentially offset portions 25 and 26, the latter having an inwardly inclined guiding surface 27 at its end. The offset portion 25 is designed to receive the lug 20 which has a rearwardly projecting hook 28 which engages beneath the rim at the end of the offset portion, as indicated in Fig. 10. The lug 21 has a rearwardly projecting hook 29 which is adapted to be guided down the inclined surface 27 into the offset slot portion 26, when the end of the ring and lug can be slid laterally outward until the hook portion 29 engages beneath the rim at the end 24 of the slot 22. In the operation of attaching the ring to the rim the lug 20 is first inserted in the slot 22 and the ring moved slightly in a circumferential direction until the hook 28 engages beneath the rim at the end of the offset portion 25. The lug 21 is then inserted in the slot with the end of hook 29 engaging the inclined face 27, down which it is slit; the rim end and lug 21 are then moved laterally outward with the lug 21 in engagement with the inclined face 24, which acts as a wedge to draw the ring about the rim and force the ends of the ring together. As this wedging takes place the hook 29 engages beneath the rim at the end 24 of the slot and both ends of the ring are secured firmly to the rim. The parts are held in this position by the pressure of the inflated tire, though, if desired for additional security, a tire clip 30 may be used opposite this point. The valve stem of the tire is preferably located at a point diametrically opposite the split 4 in the rim and the split 14 in the ring 10 may also advantageously be located at the same point. The clip 30 may then be mounted upon the valve stem 31 as shown.

The split rim 3 is held upon the wheel firmly by the pressure exerted by the inflated tire. The latter exerts a heavy pressure directly inward upon the rim, and also tends to force the ring 6 laterally, causing the inclined face 7 to bear against and ride upon the inclined face of the flange 5, and thus, through the resulting wedging action, tending to cause the rim 3 to contract. The endless ring or flange 6 obviously prevents the opening of the split rim beyond a certain point, as does also the split flange 10, the ends of which are locked together in the slot 22. As a further means of holding the ends of the rim 3 together when the same is mounted upon the wheel, or of holding them in slightly separated position when the rim is to be applied to or removed from the wheel, I preferably use an auxiliary locking mechanism or latch device which may be of the form shown in Figs. 1, 4, 5, 6 and 7. The mechanism shown is a modification of that shown and described and claimed broadly in my application, Serial No. 497,625, filed May 22, 1909. The mechanism which I have shown comprises a latch 40 pivoted at one end to a bracket 41 mounted upon one end of the split rim. At the other end the latch has formed in its under surface a transverse groove 42 adapted to receive and engage with a pyramidal lug 43 secured to or formed upon the other end of the split rim. I prefer to make this lug in the form shown in Fig. 8, in which it is provided with a downwardly projecting tenon 44 adapted to project through a slot formed through the end of the rim and through a plate 45 secured to the end of the rim for a purpose to be hereinafter explained and to be riveted over beneath said plate. The latch 40 is adapted either to have its outer end 46 engage the outer side of the lug 43, as shown in Fig. 6, in which case it holds the rim in expanded position, or to receive the lug 43 in the groove 42, as shown in Fig. 5, in which case the rim is held contracted upon the wheel. For securing the latch in either of these two positions, I provide a cap screw 50 having a head 51 engaged beneath the plate 45 and screwed into the swiveled nut 52 carried by the latch 40. The latch 40 is preferably provided with a slot having a bearing surface 53 curved longitudinally to a circular arc against which bears the similarly curved under surface of the nut 52. The upper surface of the nut 52 is preferably formed of two inclined surfaces 54 which meet to form an obtuse apex 55. The nut is held in its socket by means of a strip of metal 56, secured at its ends to the latch, which bears upon the apex 55 of the nut, and, in addition to retaining it upon its seat, prevents its too free oscillation. The plate 56 also provides a smooth bearing surface for the inner tube 57 of the tire. The rim and plate 45 are provided with a slot 58 through which the cap screw 50 passes, the length of the slot allowing for the expansion and contraction of the rim. The latter are also provided for, however, by the swiveling of the nut 52 which permits the screw 50 to oscillate circumferentially. Thus, in case in applying the rim to the wheel the screw 50 binds in its slot, it will not be sheared off by the great pressure exerted by the air in the tire, but will swing, carrying with it the nut 52. In order to provide room for the head 51 of screw 50 and to permit the same to be operated, the felly is cut away and the fixed rim 2 is depressed to provide a recess 60. In order to exclude dust and dirt from this recess, to prevent the clogging of the latch mechanism, I preferably provide closures therefor, these comprising a flange 61 at one side of the recess, which may be formed integral with the rim 2, or otherwise permanently secured in place, a movable cover 62 being provided at the other side of the recess. The cover 62 may be attached in any suitable manner, preferably being pivoted to the felly at one end, as indicated at 63, and having an open slot 64 at its other end adapted to engage the screw 65. The head 66 of the latter, when screwed down upon the end of the cover 62, retains the latter in position; the cover 62 may, however, be moved to inoperative position by simply loosening this screw and without detaching entirely any part from the wheel.

The method of operation of my rim and of the assembling of its parts is as follows: The split rim 3 being removed from the wheel and the cap screw 50 being loosened, the end of the latch 15 may be moved over the lug 43 and the rim contracted into the position shown in Fig. 5. The endless flange 6 may now be slipped over the rim into contact with the flange 5 and the tire may be applied. If thought desirable or necessary the cap screw 50 may be entirely removed, when the ends of the split rim may be lapped by each other to further reduce its diameter. After the tire has been applied to the rim, as described, the split flange 10 is put in place and its ends secured to the rim, as has already been described. This may be done either before or after the rim has been expanded to the position shown in Fig. 6, which expansion may be accomplished in any suitable manner, as by the use of a suitable tool, which may be engaged with the holes 70 formed in the under surface of the rim. The rim is held in expanded position by screwing up the screw 50 with the latch abutting against the outer edge of the lug 43, as shown in Fig. 6. The tire can now be inflated, when the rim is ready for application to the wheel. In accomplishing the latter result the valve stem 31 is slipped through the opening 71 in the felly, the bushing 72 preferably projecting from the rim 3 about the valve opening in the latter, and entering the recess 73 in the felly formed to receive the same, after which the rim is slid laterally upon the wheel until the shoulder 13 engages the side of the same. The screw 50 is now loosened, permitting the end of latch 40 to ride over the lug 43 and the rim to be contracted under the force of the air pressure in the tire, acting as above set forth. The screw 50 may then be tightened up to hold the latch in engagement with the lug 43, as shown in Fig. 5, after which the cover 62 is swung to closed position and held in place by tightening up screw 65. If desired, additional means for securing the rim to the wheel may be used, such, for instance, as the set screws 80 passing through threaded bushings 81 carried by the felly and engaging elongated recesses 82 in the under surface of the rim. In case it is desired to remove a tire from the wheel, the rim may be used either as a demountable or as a so-called quick-detachable rim. In the former case, to remove a tire the air pressure is released from the latter, permitting the rim to be expanded and slipped from the wheel. If it is desired to operate the rim as a so-called "quick-detachable" rim, the air pressure is released, but the rim is retained upon the wheel by means of the latch 40 and the set screw 50, the split flange 10 being removed by unhooking the lugs 21 and 20 from their retaining slot 22. The operation of the rim in this case is that of a standard "quick-detachable" rim or rim having a removable tire-retaining flange such as is shown in my Patent No. 926,296 above referred to.

In Figs. 12 and 13 I have shown a modified form of my rim in which the split rim $3^a$, instead of having the offset channel 11, is inclined downwardly at 90, an outwardly inclined flange 91 being provided to retain the split flange $10^a$ against lateral movement. The latter has an inclined face 92 to engage the inner face of the flange 91. The rim is preferably provided with an inwardly projecting bead 93 forming a shoulder for limiting lateral movement of the rim. Locking means similar to those show in Figs. 9, 10 and 11 are preferably provided for securing the ends of the flange to the rim. In Fig. 12 I have shown also how the endless retaining flange 6 may be dispensed with, the split rim $3^a$ having its edge turned up to form a tire retaining flange $6^a$.

In Fig. 14 I have shown a somewhat different modification of my rim in which the split flange $10^b$ is mounted upon a laterally extended portion of the rim $3^b$ level with the tire seating surface of the latter. An upturned flange $12^b$ is provided for retaining the flange $10^b$ against lateral movement. In this case, in order to remove the endless flange 6, it will ordinarily be necessary to remove the rim from the wheel and contract the latter by lapping its ends.

In describing the above modifications I have not intended to indicate that they are all the modifications of which my invention is capable, for it is apparent that a great many other changes are possible without departing from the scope of the same.

Having thus described my invention, I claim:

1. In a vehicle wheel, in combination, a fixed member, a split rim detachably mounted thereon carrying tire retaining means, a latch on one end of said split rim, means on the other end of said split rim adapted to be engaged by said latch, said latch having mounted thereon an oscillating nut, and a screw passing through a slot in the last named end of said rim engaging a threaded opening in said nut.

2. In a vehicle wheel, in combination, a fixed member, a split rim detachably mounted thereon carrying tire retaining means, a latch on one end of said split rim, means on the other end of said split rim adapted to be engaged by said latch, the said latch being provided with a recess having a concave bearing surface, a nut bearing on said surface, and a screw passing through a slot in the last named end of said rim engaging a threaded opening in said nut.

3. A transversely split demountable tire carrying vehicle wheel rim having means for locking its ends together or in spaced relation, said means comprising a latch connected to one end of said rim, a lug attached to the other end of said rim by means of an integral tenon projecting through a slot in the latter, and means for holding said latch in engagement with said lug.

EDWIN C. SHAW.

Witnesses:
WALTER K. MEANS,
MARCUS H. HILL.